US011138530B2

(12) United States Patent
Krier et al.

(10) Patent No.: US 11,138,530 B2
(45) Date of Patent: Oct. 5, 2021

(54) ACTION DETERMINATION FOR CASE MANAGEMENT

(71) Applicant: ServiceNow, Inc., Santa Clara, CA (US)

(72) Inventors: Andrew Krier, San Diego, CA (US); Matthew David Lloyd, Santa Clara, CA (US); Luchuan Liu, Fremont, CA (US); Lifen Yan, Santa Clara, CA (US); Antin Brucelee Selvaraj, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 178 days.

(21) Appl. No.: 16/358,349

(22) Filed: Mar. 19, 2019

(65) Prior Publication Data

US 2020/0302349 A1    Sep. 24, 2020

(51) Int. Cl.
*G06Q 10/06* (2012.01)
*G06F 16/903* (2019.01)

(52) U.S. Cl.
CPC ..... *G06Q 10/063* (2013.01); *G06F 16/90335* (2019.01); *G06Q 10/067* (2013.01)

(58) Field of Classification Search
CPC ............... G06Q 10/063; G06Q 10/067; G06F 16/90335
USPC ....................................................... 705/7.11
See application file for complete search history.

(56) References Cited

U.S. PATENT DOCUMENTS

| | | |
|---|---|---|
| 6,609,122 B1 | 8/2003 | Ensor |
| 6,678,887 B1 | 1/2004 | Hallman |
| 7,020,706 B2 | 3/2006 | Cates |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Vlatharu |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,716,353 B2 | 5/2010 | Golovinsky |

(Continued)

OTHER PUBLICATIONS

Aslam-Zainudeen, Nafisah; Labib, Ashraf. Practical application of the Decision Making Grid (DMG). Journal of Quality in Maintenance Engineering17.2 (2011): 138-149.*

(Continued)

*Primary Examiner* — Timothy Padot
(74) *Attorney, Agent, or Firm* — Fletcher Yoder PC

(57) ABSTRACT

The present disclosure is related to a case management application that may be utilized by a user to open a service case associated with a service event. The case management application may receive information associated with the service case and/or the user to provide a recommended action to address the service event. In some embodiments, the case management application may access a recommendation tool that includes a trend model that may be used by the case management application to determine the recommended action. A designer may be able to modify the recommendation tool and/or the trend model accessed by the case management application to adjust how the case management application determines a recommended action to provide to the user.

13 Claims, 13 Drawing Sheets

(56) References Cited

U.S. PATENT DOCUMENTS

| | | |
|---|---|---|
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon |
| 8,674,992 B2 | 3/2014 | Poston |
| 8,689,241 B2 | 4/2014 | Naik |
| 8,743,121 B2 | 6/2014 | De Peuter |
| 8,744,903 B2 * | 6/2014 | Waguet ............... G06Q 10/06 705/7.36 |
| 8,832,652 B2 | 9/2014 | Mueller |
| 8,887,133 B2 | 11/2014 | Behnia |
| 9,065,783 B2 | 6/2015 | Ding |
| 9,098,322 B2 | 8/2015 | Apte |
| 9,122,552 B2 | 9/2015 | Whitney |
| 9,239,857 B2 | 1/2016 | Trinon |
| 9,317,327 B2 | 4/2016 | Apte |
| 9,363,252 B2 | 6/2016 | Mueller |
| 9,535,737 B2 | 1/2017 | Joy |
| 9,557,969 B2 | 1/2017 | Sharma |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,211 B2 | 10/2017 | Kelkar |
| 2005/0060323 A1* | 3/2005 | Leung ............... G05B 23/0275 |
| 2011/0137711 A1* | 6/2011 | Singh ............... G06F 11/079 705/7.38 |
| 2014/0129536 A1* | 5/2014 | Anand ............... G06N 7/005 707/706 |
| 2015/0142720 A1 | 5/2015 | Beechuk et al. |
| 2019/0121334 A1* | 4/2019 | Song ............... G06N 5/046 |

OTHER PUBLICATIONS

Fujitsu Develops Industry's First System-Failure Management Technology for Cloud Computing Era. Anonymous. ACN Newswire—Asia Corporate News [Tokyo] Feb. 23, 2010 (6 pgs.).*

International Search Report and Written Opinion for PCT Application No. PCT/US2020/023201 dated Jun. 12, 2020; 11 pgs.

Kan et al.: "A computer-facilitated method for matching incident cases using semantic similarity measurement"; IEEE International Symposium on Intergrated Network Management-Workshops 2009; Jun. 1, 2009; pts. 10-19 (XP031504364).

Guo et al: "A Knowledge-Based Intelligent System for Power Customer Service Management", IEEE International Conference on Machine Learning and Cybernetics, Aug. 1, 2007; pp. 2925-2930 (XP031154314).

* cited by examiner

FIG. 8

| TREND DEFINITIONS [NEW] SEARCH [ORDER ▽ SEARCH] | | | | | | |
|---|---|---|---|---|---|---|
| ▽ ALL 302 | 372 | 256 | 374 | 348 | 376 | 264 |
| ✲ ◎ ▦ NAME | ▦ TREND ID | ▦ TABLE | ▦ TREND TYPE | ▦ ORDER △ | ▦ THRESHOLD | ▦ UPDATED |
| SEARCH | SEARCH | SEARCH | SEARCH | SEARCH | SEARCH | SEARCH |
| ☐ ⊙ SIMILAR MAJOR INCIDENT | similar_major_incident | INCIDENT [incident] | COMMON CONDITION | 100 | 1 | 0219-02-19 14:19:51 |
| ☐ ⊙ POTENTIAL MAJOR INCIDENT | potential_major_incident | INCIDENT [incident] | COMMON CONDITION | 200 | 1 | 0219-02-19 14:19:53 |
| ☐ ⊙ SIMILAR ATTACHED KNOWLEDGE ARTICLE | similar_attached_knowledge_article | INCIDENT [incident] | COMMON REFERENCE | 300 | 3 | 0219-02-19 13:14:40 |
| ☐ ⊙ SIMILAR RELATED PROBLEM | similar_related_problem | INCIDENT [incident] | COMMON REFERENCE | 400 | 3 | 0219-02-19 14:30:46 |
| ☐ ⊙ SIMILAR RELATED CAUSED BY CHANGE | similar_related_caused_change | INCIDENT [incident] | COMMON REFERENCE | 500 | 3 | 0219-02-19 14:31:37 |
| ☐ ⊙ SIMILAR RESOLUTION CODE | similar_resolution_code | INCIDENT [incident] | COMMON VALUE | 600 | 3 | 0219-02-19 16:29:58 |
| ☐ ACTIONS ON SELECTED ROWS... △▽ 350 | | | | | | |

346

370

270

AGENT INTELLIGENCE SIMILARITY ANALYZER

TREND DEFINITION

ACTION DETERMINATION FOR CASE MANAGEMENT

BACKGROUND

The present disclosure relates generally to case management and, specifically, to providing recommended actions to address service events.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

Certain service events may occur in the context of such systems, which may impact a performance of certain devices and/or networks. Service cases may be opened to manage and address different service events, such as by providing information for the service events to facilitate addressing such service events. In some circumstances, it may be difficult or tedious to determine the suitable actions to perform and address the service events.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to determining and providing recommended actions to address service events. A user, such as an agent, may open a service case via a case management application to address a particular service event. The agent may enter information into the service case and the case management application may automatically determine an action for the agent to apply. For example, the case management application may search for similar service cases using information associated with the service case. Upon determining similar service cases, the case management application may search for subsets of matched service cases that share a common characteristic. Once a particular subset of matched service cases is identified, the case management application may determine a recommended action based on performed actions associated with each service case of the subset of matched service cases.

The case management application may be configured or customized by a designer. As an example, the case management application may access a recommendation tool stored in a database to determine how to identify subsets of matched service cases to determine the recommended action. The designer may configure the case management application by selecting which recommendation tool is accessible to the case management application and/or modifying the recommendation tool accessed by the case management application.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 8 is an embodiment of a definition interface that may be accessed by a designer to view one or more trend models, in accordance with aspects of the present disclosure;

DETAILED DESCRIPTION

Figure 1:
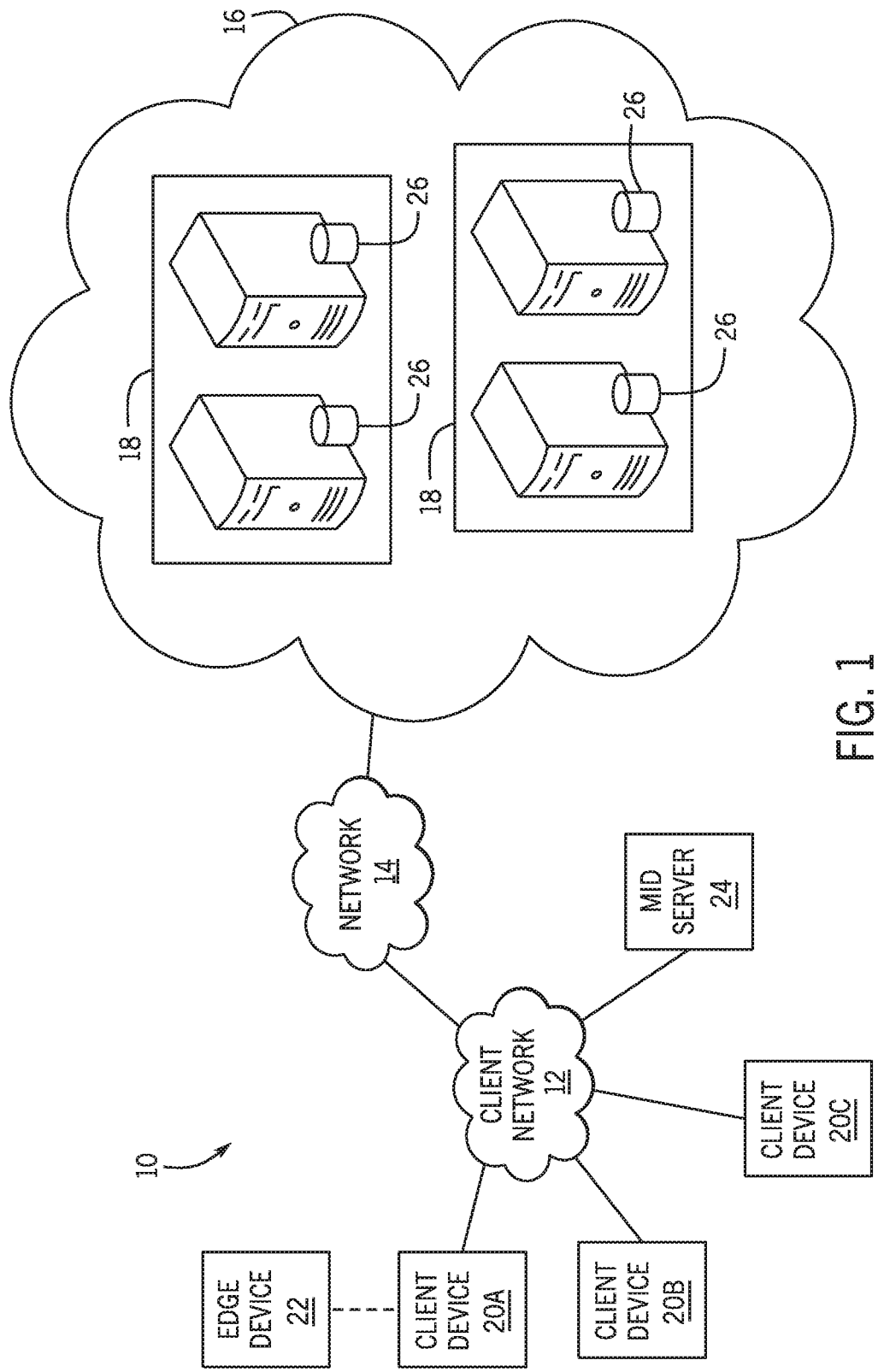
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

A case management application may be used to manage and address service events (e.g., incidents, alerts, problems, and so forth, experienced by a customer). A user (e.g., a customer service agent) of the case management application may open a service case for each service event. In each service case, the user may provide information pertaining to the associated service event. The user may determine one or more actions that may be performed to address the service event. However, determining the suitable actions may be difficult or time consuming. For example, the user may have to search for possible actions and/or root causes of the event, assess the feasibility of performing each action, test certain actions, and so forth, before being able to apply a suitable action to address the service event.

Thus, a case management application configured to provide one or more recommended actions to the user may reduce an amount of time the user spends to address the service case. For example, the case management application may receive information entered by the user into service case, and the case management application may identify other similar service cases based on the received information. The case management application may then further identify matched service cases that are a subset of the similar service cases. Based on performed actions associated with the matched service cases, the case management application may provide a corresponding recommended action. By automatically providing a recommended action, the case management application may enable the user to avoid determining suitable actions manually, which may include having to search through and filter multiple actions performed in similar service cases. For this reason, the user may address service cases more quickly. As used herein, a recommended action includes any action that a customer may perform to address the service event. For example, the recommended action may be provided to the user assisting the customer of the service event, in which case the user may apply the recommended action, or provide the recommended action to the customer for the customer to perform.

In addition, a designer of the case management application may be able to configure, customize, and/or modify the case management application, such as via a design application. For example, the designer may configure how the case management application identifies matched service cases. In this manner, the designer may change how the case management application may provide recommended actions based on the identified matched service cases.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
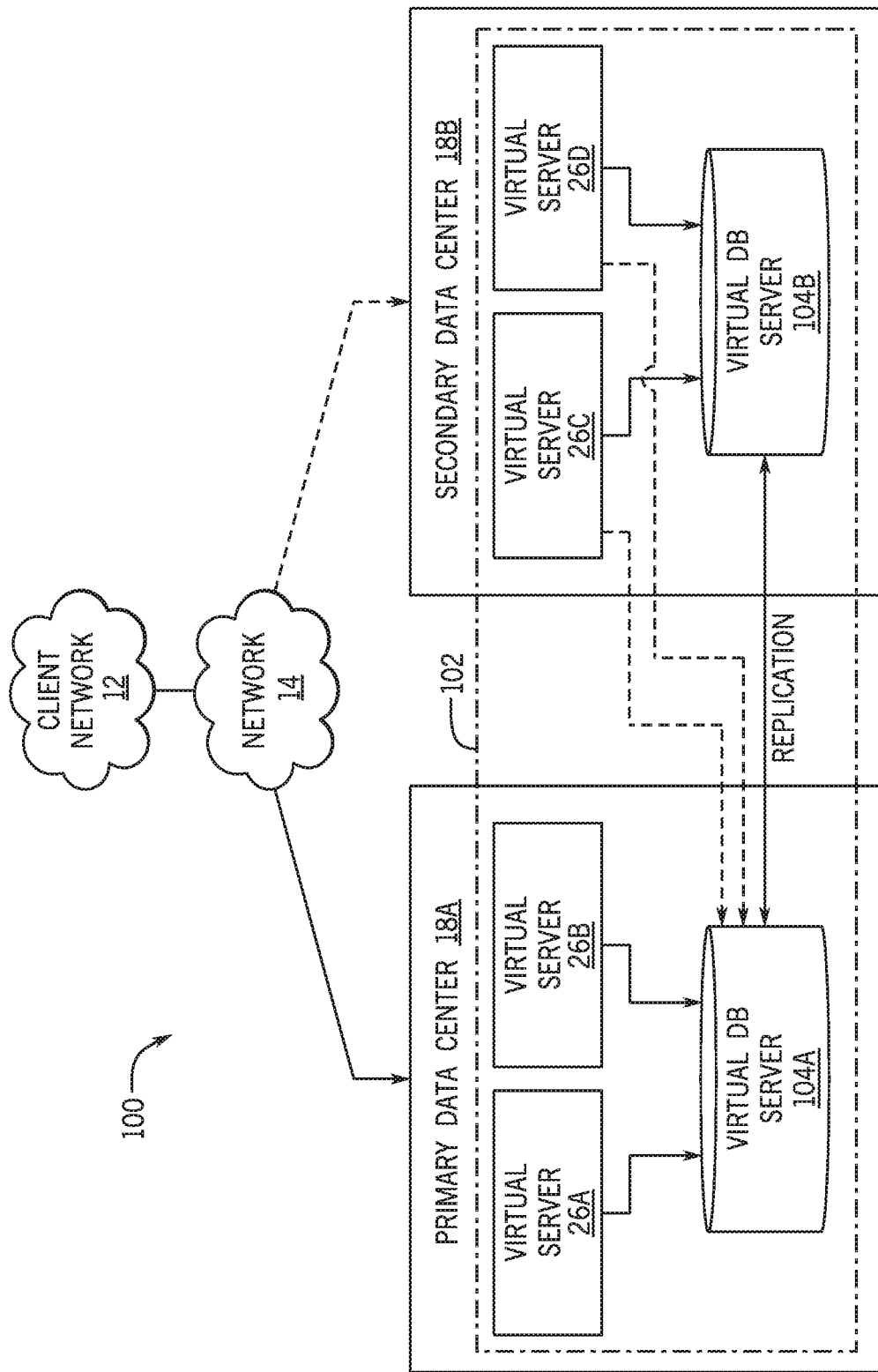
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
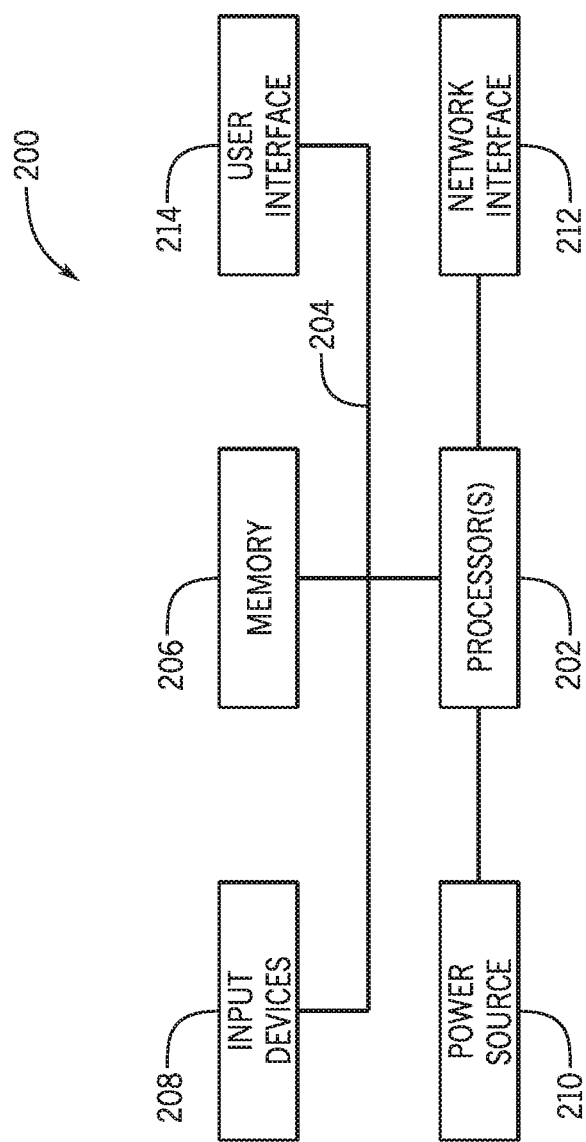
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
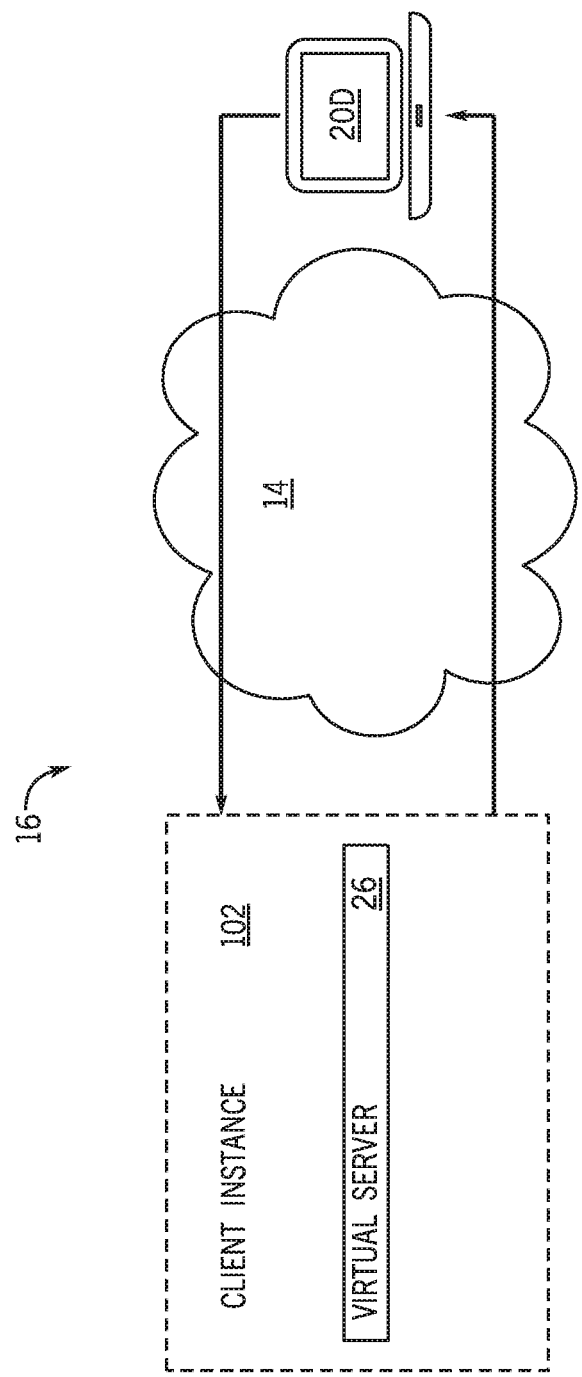
FIG. 4 is a block diagram illustrating an embodiment in which a virtual server supports and enables the client instance, in accordance with aspects of the present disclosure.

With the preceding in mind, FIG. 4 is a block diagram illustrating an embodiment in which a virtual server 26 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20D via the network 14 to provide a user interface to network applications executing within the client instance 102 (e.g., via a web browser of the client device 20D). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device 20D, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

As discussed herein, the client instance 102 may be implemented so as to support access to a case management application. The case management application may be used to create service cases and provide a recommended action to address each service case. By way of example, the case management application may receive information associated with the service and/or the user. Based on the received information (e.g., keywords, phrases) and/or another characteristic (e.g., an attribute associated with the user), the case management application may identify other similar service cases. Furthermore, the case management application may search the similar service cases to identify a subset of matched service cases. The case management application may then provide a recommended action based on the identified matched service cases. In some embodiments, the case management application may be a cloud-based application running on the cloud-based platform 16 that is accessed via the client device 20. For example, the case management application may be executed on an application server running on the cloud based platform 16 and may access models (e.g., tables, machine learning routines)

stored on the cloud-based platform 16. The case management application may identify the subset of matched cases based on the accessed models.

Figure 5:
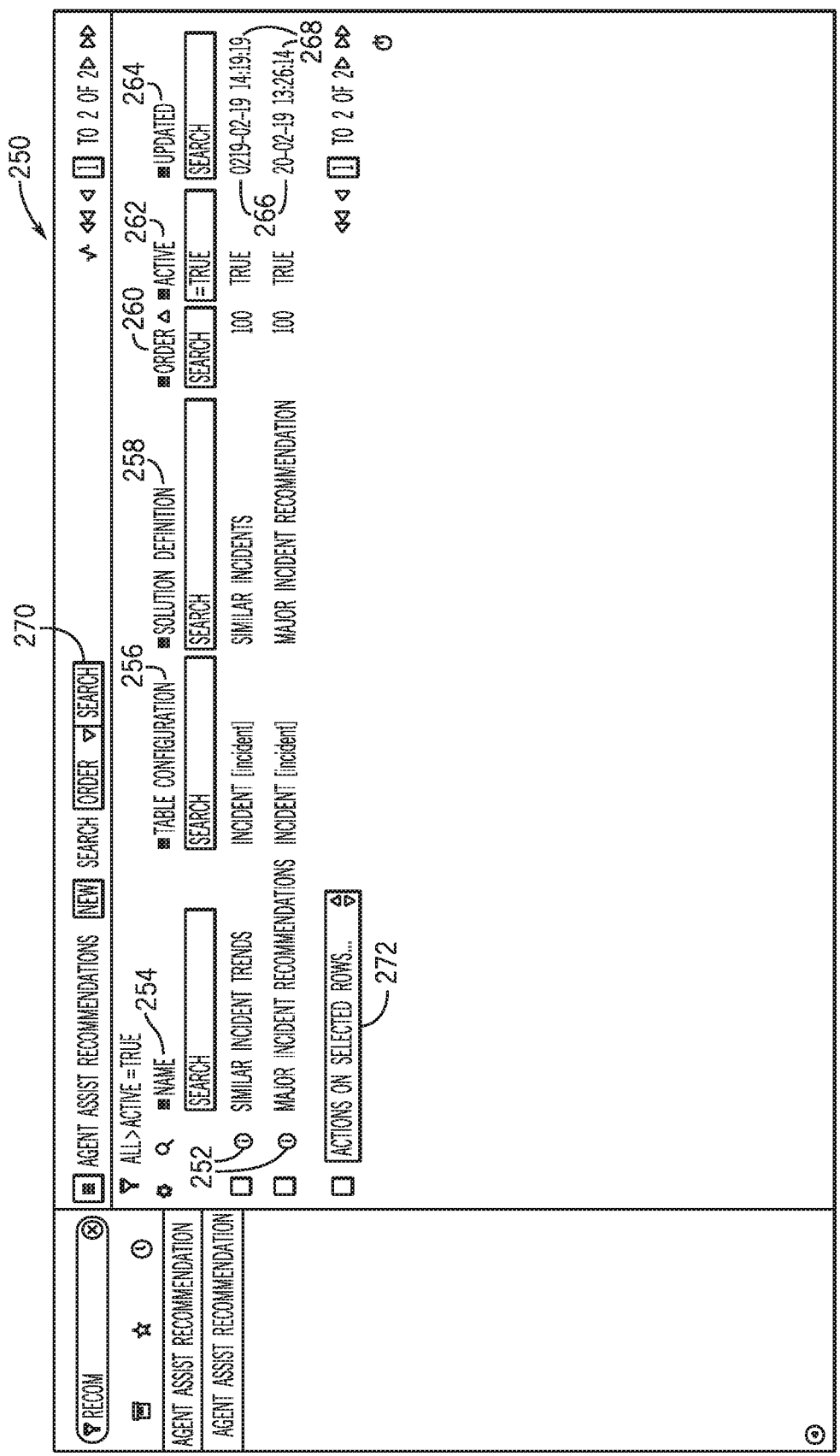
FIG. 5 is an embodiment of a design interface that may be accessed by a designer to select one or more recommendation tools accessible to a case management application, in accordance with aspects of the present disclosure.

FIG. 5 is an embodiment of a design interface 250 that may be accessed by a designer (e.g., via a design application) of the case management application. The design interface 250 may include available recommendation tools 252 that may be accessed by the case management application, in which each recommendation tool 252 may be used to identify the subset of matched cases. Although FIG. 5 illustrates there being two available recommendation tools 252, there may be any number of recommendation tools 252.

The design interface 250 may also include respective information and/or control features associated with each recommendation tool 252. In certain embodiments, the design interface 250 may include a plurality of fields that each provides a type of information for each recommendation tool 252. For example, the implemented embodiment includes a name field 254, a table field 256, a solution definition field 258, an order field 260, an active field 262, and an updated field 264. However, additional or alternative fields may also be included. The name field 254 may provide a name for each recommendation tool 252 that uniquely identifies the recommendation tools 252 from one another. The table field 256 may provide a particular table that is referred to when the associated recommendation tool 252 is invoked, in which the table may be used to determine a corresponding recommended action. The solution definition tool 258 may provide a category, grouping, or type associated with the recommendation tool 252.

The order field 260 may provide a sequence of which the recommendation tool 252 is used by the case management application. As an example, if a first recommendation tool 252 has an order of 100 and a second recommendation tool 252 has an order of 200, which is of a lower order than the first recommendation tool 252, the case management application may use the first recommendation tool 252 first to identify a recommended action. If no recommended action is identified, the case management application may then use the second recommendation tool 252 to identify a recommended action. The active field 262 may indicate if the associated recommended tool 252 is being used by the case management application. For example, if the active field 262 includes "true," the recommended tool 252 may be active and may be accessed by the case management application. If the active field 262 includes "false," the recommended tool 252 may not be active and may not be accessed by the case management application. The updated field 264 may indicate when the associated recommended tool 252 was previously updated or modified. In some embodiments, the updated field 264 may include a date 266 and/or a time 268.

The design interface 250 may further include a search box 270 that the designer may use to query a particular recommendation tool 252, such as based on one of the fields depicted in the design interface 250. As an example, the designer may enter typed information into the search box 270 and recommendation tools 252 having the typed information may be displayed on the design interface 250. Moreover, the design interface 250 may include an action box 272 that the designer may use to perform a design action associated with one or more of the recommendation tools 252. By way of example, the designer may remove one of the recommendation tools 252 from the design interface 250, add another recommendation tool 252 to the design interface 250, view other information associated with one of the recommendation tools 252, modify one of the recommendation tools 252, and so forth.

Figure 6:
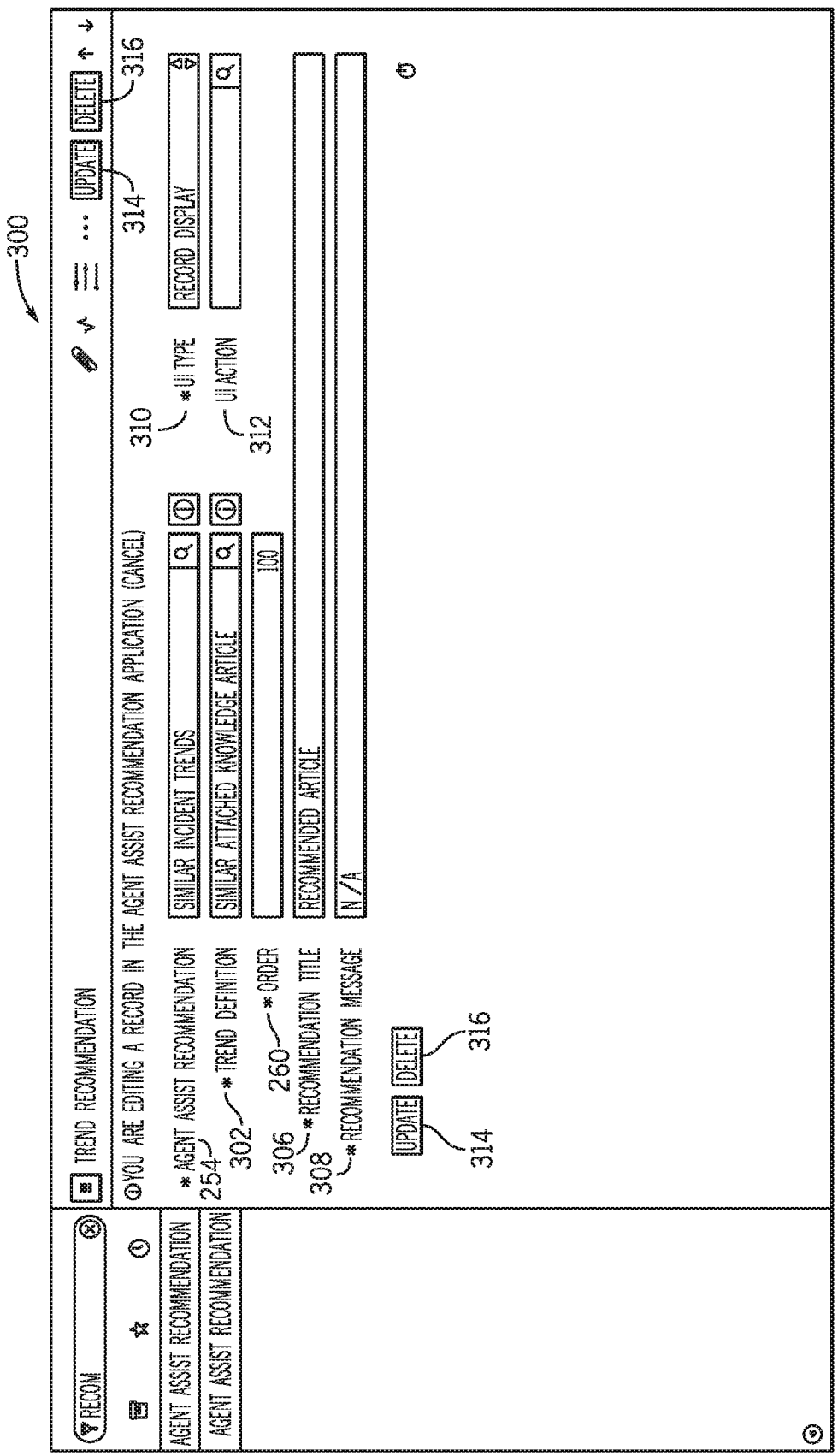
FIG. 6 is an embodiment of a detailed interface that may be accessed by a designer to modify a recommendation tool, in accordance with aspects of the present disclosure.

FIG. 6 is an embodiment of a detailed interface 300 that may be accessed by a designer to modify one of the recommendation tools 252 of FIG. 5 of the detailed interface 300. For example, each of the recommendation tools 252 of FIG. 5 may be selectable, and the detailed interface 300 may be invoked in response to a selection of one of the recommendation tools 252 by the designer. Using the detailed interface 300, the designer may be able to configure the recommendation tool 252 and modify how the case management application identifies matched cases.

The detailed interface 300 may also include control features that enable the designer to modify the recommendation tools 252. In some embodiments, the detailed interface 300 may include the name field 254 and the order field 260. Moreover, the detailed interface 300 may include a trend model name field 302, a recommendation title field 306, a recommendation message field 308, a user interface type field 310, and a user interface action field 312. However, it should be noted that the detailed interface 300 may include additional or alternative fields.

The trend model name field 302 may be adjustable by the user to select a particular trend model that may be used by the case management application to search through the similar service cases and identify matched cases based on a particular feature. For example, the particular feature may be a resource (e.g., a knowledge article). In this example, when the recommendation tool 252 is invoked, the case management application may search through the similar service cases to determine if multiple cases attach the same resource. The recommendation title field 306 may provide a name of the recommended action(s) determined by the recommendation tool 252 when the recommendation tool 252 is invoked by the case management application. The recommendation message field 308 may depict a text output that may be displayed when the recommendation tool 252 provides the recommended action. The user interface type field 310 may provide a category, grouping, or type associated with the recommended action. The user interface action field 312 may depict a particular recommended action provided by the case management application when the recommendation tool 252 is invoked.

In some embodiments, the detailed interface 300 may include an update icon 314 and/or a delete icon 316. Both the update icon 314 and the delete icon 316 may be selectable by the designer. As an example, selecting the update icon 314 may apply the changes made by the designer via the detailed interface 300 to the recommendation tool 252. Moreover, selecting the delete icon 314 may delete the recommendation tool 252 such that the recommendation tool 252 may not be accessed by any case management application.

Figure 7:
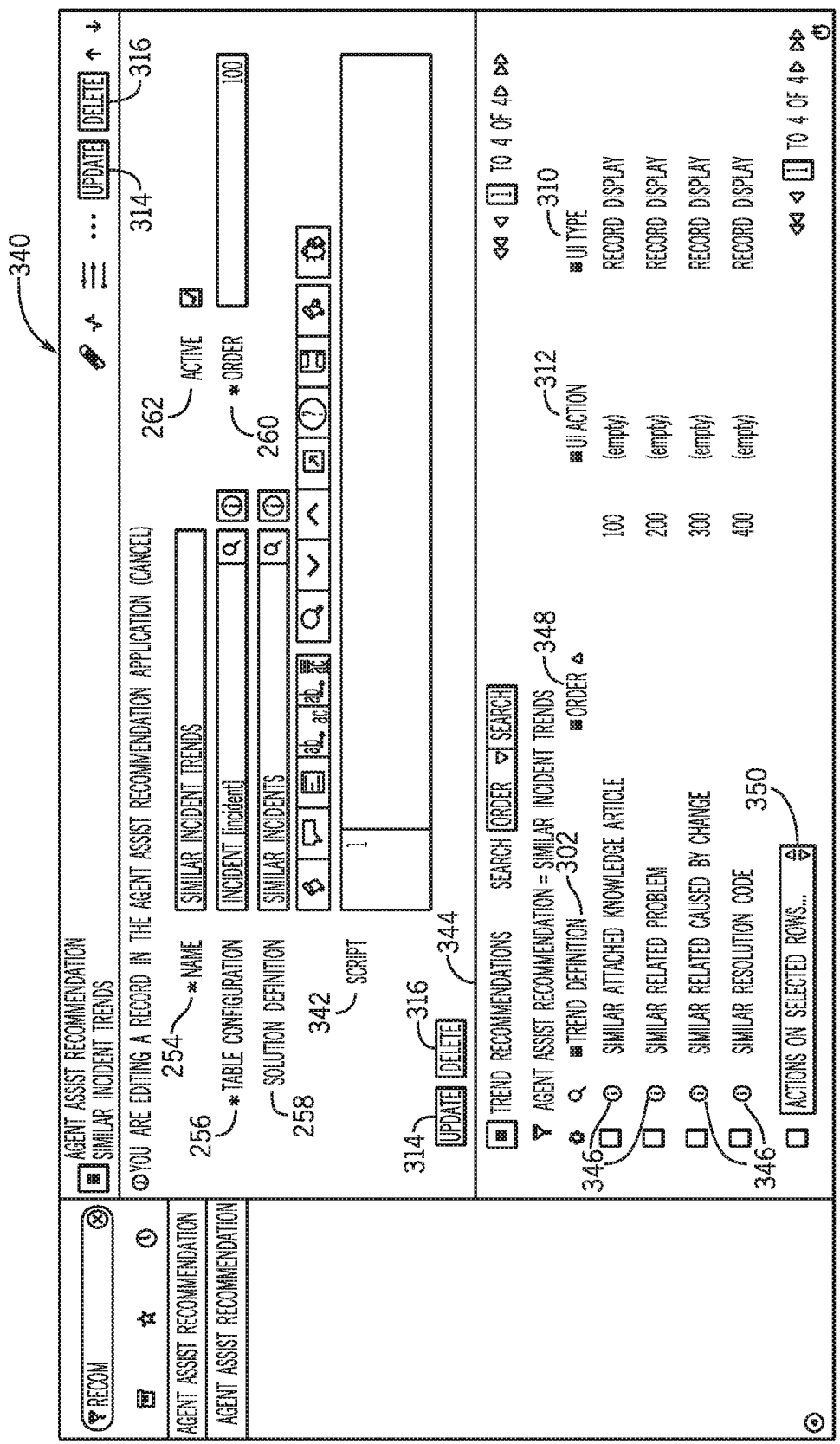
FIG. 7 is an embodiment of another detailed interface that may be accessed by a designer to modify another recommendation tool, in accordance with aspects of the present disclosure.

FIG. 7 illustrates an additional detailed interface 340 that may be accessed by a designer to modify one of the recommendation tools 252 of FIG. 5. The additional detailed interface 340 may also include control features that enable the designer to modify additional or alternative information associated with the recommendation tool 252 relative to the detailed interface 300. For example, the additional detailed interface 340 may include the name field 254, the table configuration field 256, the solution definition field 258, the active field 262, and the order field 260, each of which may be modified by the designer to modify a display of the recommendation tool 252 on the design interface 250. Additionally or alternatively, the additional detailed interface 340 may include a script 342 that the designer may use to enter specific software code that may be executed by the case management application when the recommendation tool 252 is invoked. For example, the designer may use the script 342 to enable the case management application to perform a desired action that may not be enabled via the fields described with respect to the detailed interface 300 or the additional detailed interface 340.

In some embodiments, the additional detailed interface 340 may include a trend models list 344 that the designer may utilize to modify trend models 346 accessible to the case management application when the recommendation tool 252 is invoked. That is, each trend model 346 displayed in the trend models list 344 may be accessed by the case management application, in which each trend model 346 may include different parameters to identify matched service cases based on a designated shared feature, and further, to identify a recommended action based on the matched service cases. Although FIG. 7 depicts there being four trend models 346 in the trend models list 344, the additional details interface 340 may include any suitable number of trend models 346. The trend models list 344 may also include information corresponding to each trend model 346. For example, the trend models list 344 may include the trend model name field 302, the user interface type field 310, and the user interface action field 312. Furthermore, the trend models list 344 may include a trend model order field 348, which may be similar to the order field 260 indicative of a sequence to perform the trend models 346. In other words, the case management application may use a first trend model 344 having a first order to identify a recommended action. If no recommended action is identified via the first trend model 344, the case management application may use a second trend model 344 having a second order to identify a recommended action, and so forth.

The additional details interface 340 may also include a trend action box 350 that the user may select to perform a design action on one or more of the trend models 346. For example, the trend action box 350 may function similarly to the action box 272 to enable the designer to add an additional trend model 346, remove one of the trend models 346, modify one of the trend models 346, view other information associated with one of the trend models 346, and so forth.

FIG. 8 is an embodiment of a definition interface 370 that may be accessed by a designer to view and manage all available trend models 346. For example, each trend model 346 may be stored in a database of the platform 16. The definition interface 370 may display respective information and/or control features for each trend model 346. In the illustrated embodiment, the definition interface 370 includes the trend model name field 302, the table field 256, the trend model order field 348, and the updated field 264. The definition interface 370 may further include a trend model identification field 372, a trend type field 374, and a threshold field 376. In additional or alternative embodiments of the definition interface 370, other fields may be included.

The trend model identification field 372 may provide an additional identifier that distinguishes the trend model 346 from other trend models 346. The trend type field 374 may include a category, grouping, or type associated with the trend model 346. For example, the trend type field 374 may indicate how matched cases are identified (e.g., based on a shared condition, resource, value, relationship to other service events, customer or user records). The threshold field 376 may provide information associated with a minimum number of matched cases identified to determine a recommended action based on the matched cases. For example, if the threshold field 376 provides a threshold of three and the trend type field 374 provides a trend type of a shared common reference or resource, the case management application may search among the similar service cases for service cases that attach the same resource. If three or more service cases attach the same resource, the case management application may identify a recommended action based on the three or more service cases. If fewer than three service cases attach the same resource, the case management application may indicate that no recommended action is identified. As a result, the case management application may use a subsequent trend model 346 (e.g., of the next order) to identify a recommended action.

Although FIG. 8 depicts the threshold field 376 having a threshold that is a number representing a quantity of trend models 346, in additional or alternative embodiments, the threshold field 376 may include a threshold that is a percentage indicating a ratio of the number of matched service cases compared to a total number of similar service cases. By way of example, if the threshold is 10%, the case management application may identify a recommended action when the number of identified matched service cases is at least 10% of the total number of identified similar cases.

Figure 9:
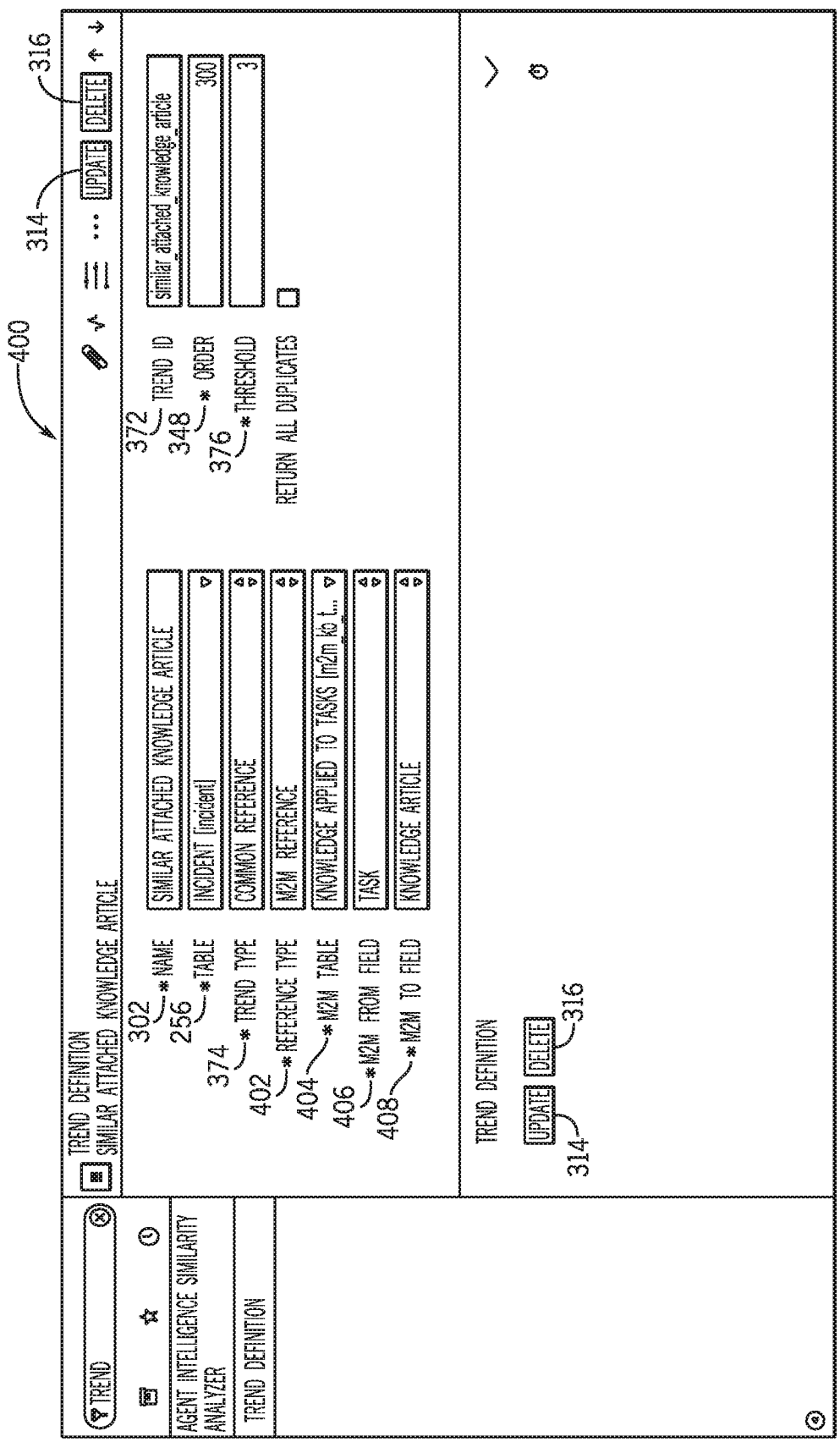
FIG. 9 is an embodiment of a trend details interface that may be accessed by a designer to modify information associated with a trend model, in accordance with aspects of the present disclosure.

FIG. 9 is an embodiment of a trend details interface 400 that may be accessed by the designer to modify a particular trend model 346. As an example, each of the trend models 346 of FIG. 8 may be selectable, and the trend details interface 400 may be invoked upon a selection of one of the trend models 346. In some embodiments, the trend details interface 400 may be used to modify a trend model 346 that has a trend type of a common reference. The trend details interface 400 may display a plurality of information and/or control features associated with the trend model 346. Each field of the trend details interface 400 may be adjustable by the designer. As such, the trend details interface 400 may include the update icon 314 and the delete icon 316 to enable the designer to modify the trend model 346 or delete the trend model 346, respectively. In the illustrated implementation, the trend details interface 400 includes the trend name field 302, the table field 256, the trend model order field 348, the trend model identification field 372, and the trend type field 374. Moreover, the trend details interface 400 may include a reference type field 402, a reference table field 404, an input field 406, and an output field 408. However, it should be noted that the trend details interface 400 may include additional or alternative fields.

The reference type field 402 may provide information of a category, grouping, or type of reference used to identify the matched service cases. The embodiment of FIG. 9 uses a many to many (M2M) type of reference, which may indicate that a single resource may be referenced by many service cases, and a single service case may reference many resources. For example, a particular knowledge article may be attached by multiple service cases, and one of those service cases may also attach many different knowledge articles. The reference table field 404 may indicate a particular reference table that may be referred to by the case management application when the trend model 346 associated with reference type is invoked. The input field 406 may indicate a first type of information to be identified via the trend data 346. The output field 408 may indicate a second type of information related to the first type of information to be identified via the trend data 346. That is, for the illustrated embodiment, in which the input field 406 indicates a task and the output field indicates a knowledge article, the case management application may search for task-type service events that reference the same knowledge article.

Figure 10:
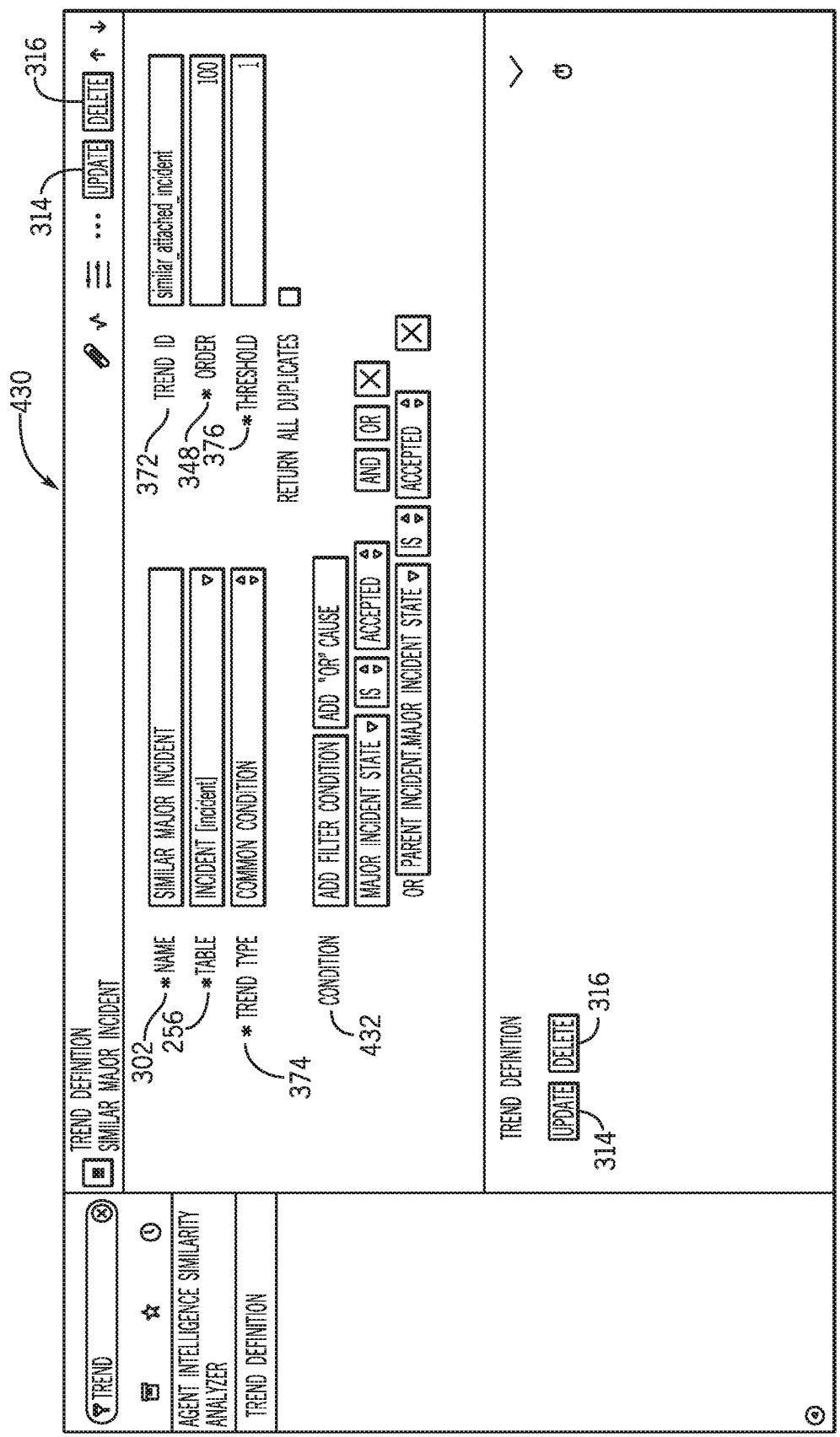
FIG. 10 is an embodiment of another trend details interface that may be accessed by a designer to modify information associated with another trend model, in accordance with aspects of the present disclosure.

FIG. 10 is an embodiment of an additional trend details interface 430 that may be accessed by the designer to modify a particular trend model 346 via control features of the additional trend details interface 430. By way of example, the additional trend details interface 430 may be used to modify a trend model 346 that has a trend type of a common condition. The additional trend details interface 430 may also include the trend model name field 302, the table field 256, trend model order field 348, the trend model identification field 372, the trend type field 374, and the threshold field 376. The additional trend details interface 430 may further include a conditions field 432 that may be modified by the designer. By way of example, the designer may specify certain features of the similar service cases that may be searched by the case management application to identify matched service cases having a shared feature. In the illustrated embodiment, the case management application searches the similar service cases for service cases that have an accepted major incident state or have an accepted parent incident state associated with the major incident. The designer may modify the condition field 432 to adjust condition criteria and/or to change the number of condition criteria used to identify matched service cases.

Other types of interfaces may be used to configure other trend models 346, in which information displayed by the interface may depend on the respective trend types of the trend models. That is, for example, for an interface used to configure a trend model having a trend type of a common value, an interface that is different than the trend details interface 400 and/or the additional trend details interface 430 may be invoked. Such an interface may include fields that the designer may adjust to modify the particular value used to identify matched service cases.

As should be noted, the fields depicted in FIGS. 6, 7, 9, and 10 may be adjusted by the designer in different manners. By way of example, the fields may be adjusted via typed text, a selectable menu, a check box or radio button, and the like. Moreover, although this disclosure primarily discusses using each recommended tool 252 to identify a single recommended action, in additional or alternative embodiments, the case management application may use one of the recommended tools 252 to identify multiple recommended actions. For example, a plurality of recommended actions may be identified, in which each recommended action may be associated with another parameter (e.g., chance of success, convenience, difficulty to implement) that may be displayed to the user to enable the user to select one of the recommended actions based on the parameters.

Moreover, FIGS. 5-10 depict interfaces that may be used by the designer to customize or configure the case management application manually. However, in additional or alternative embodiments, the case management application may automatically be customized or configured. That is, the case management application may automatically select the recommendation tool(s) 252 and/or the trend model(s) 346 to be used to identify the recommended action. For example, based on the information provided in the service case, information (e.g., login credentials) associated with the user, and/or other information, the case management application may determine the relevant recommendation tool(s) 252 and/or trend model(s) for determining the recommended action.

Figure 11:
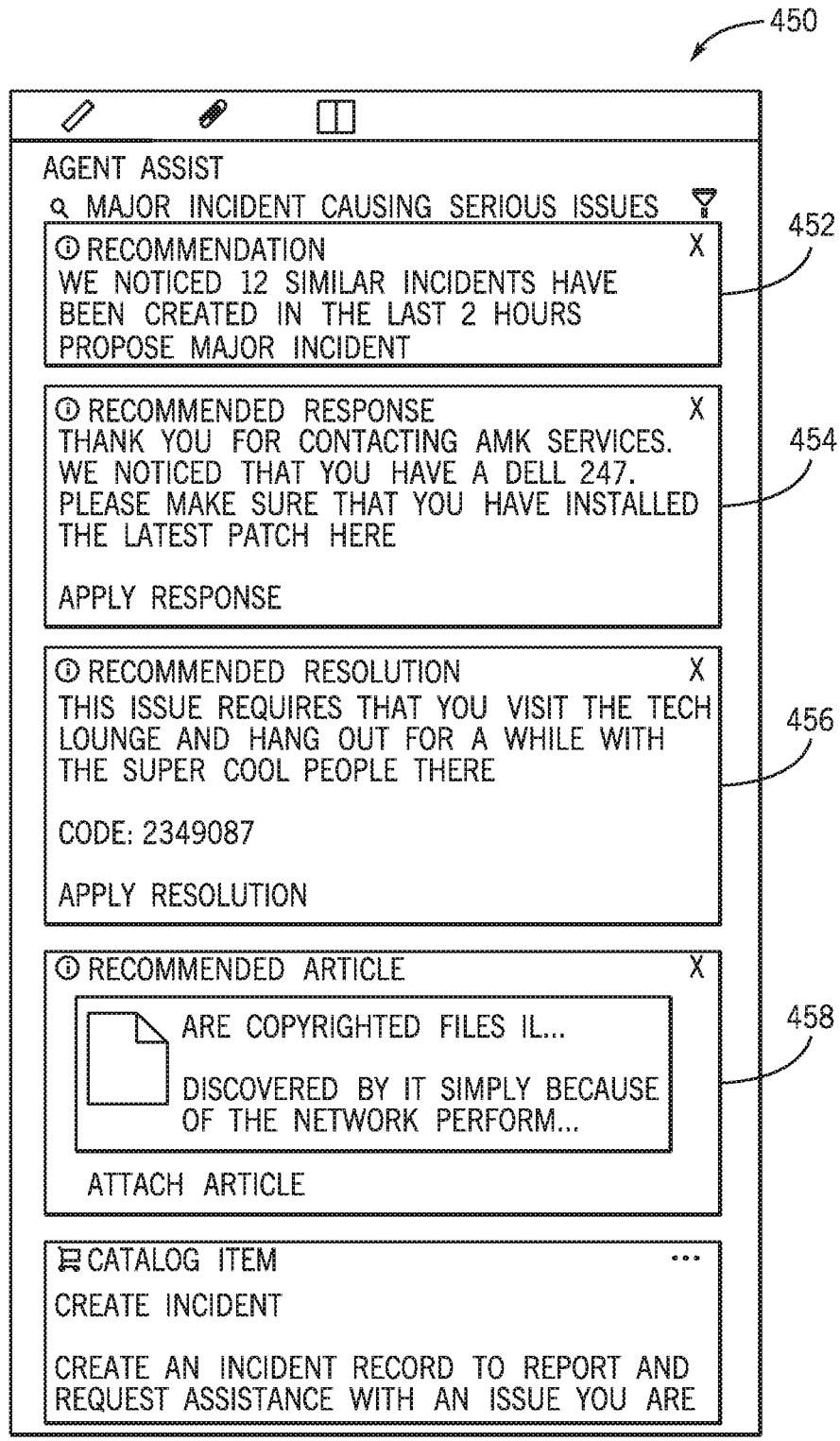
FIG. 11 is an embodiment of a recommendations interface that may be accessed by a designer to modify recommended actions provided by a case management application, in accordance with aspects of the present disclosure.

As discussed, the case management application may identify a recommended action based on the identified matched service cases. FIG. 11 is an embodiment of a recommendations interface 450 that may be accessed by the designer to modify possible recommended actions provided by the case management application. For example, the recommendations interface 450 may provide recommendation cards that may be displayed by the case management application to a user to provide a corresponding recommended action.

The recommendations interface 450 may include recommendation cards of different recommendation types, including a recommendation communication card 452 having information associated with the service event, a recommendation response card 454 having a possible reply message, a recommended resolution card 456 having a possible solution to resolve the service event, a recommended resource card 458 having a possible resource to facilitate resolving the service event, another suitable recommendation card, or any combination thereof. The designer may utilize the recommendations interface 450 to modify any of the possible recommendation cards, such as to change the text associated with each of the recommendation cards, to add additional recommendation cards, to remove one of the recommendation cards, and so forth. Additionally or alternatively, the designer may use the recommendations interface 450 to search for particular recommended actions (e.g., to associate with a particular trend model 346). Thus, the recommendations interface 450 may enable the designer to modify how each recommended action is provided or presented to the user, in which the user may apply the provided recommended action to address the service events (e.g., by presenting information associated with the recommended action to a customer associated with the service event).

Figure 12:
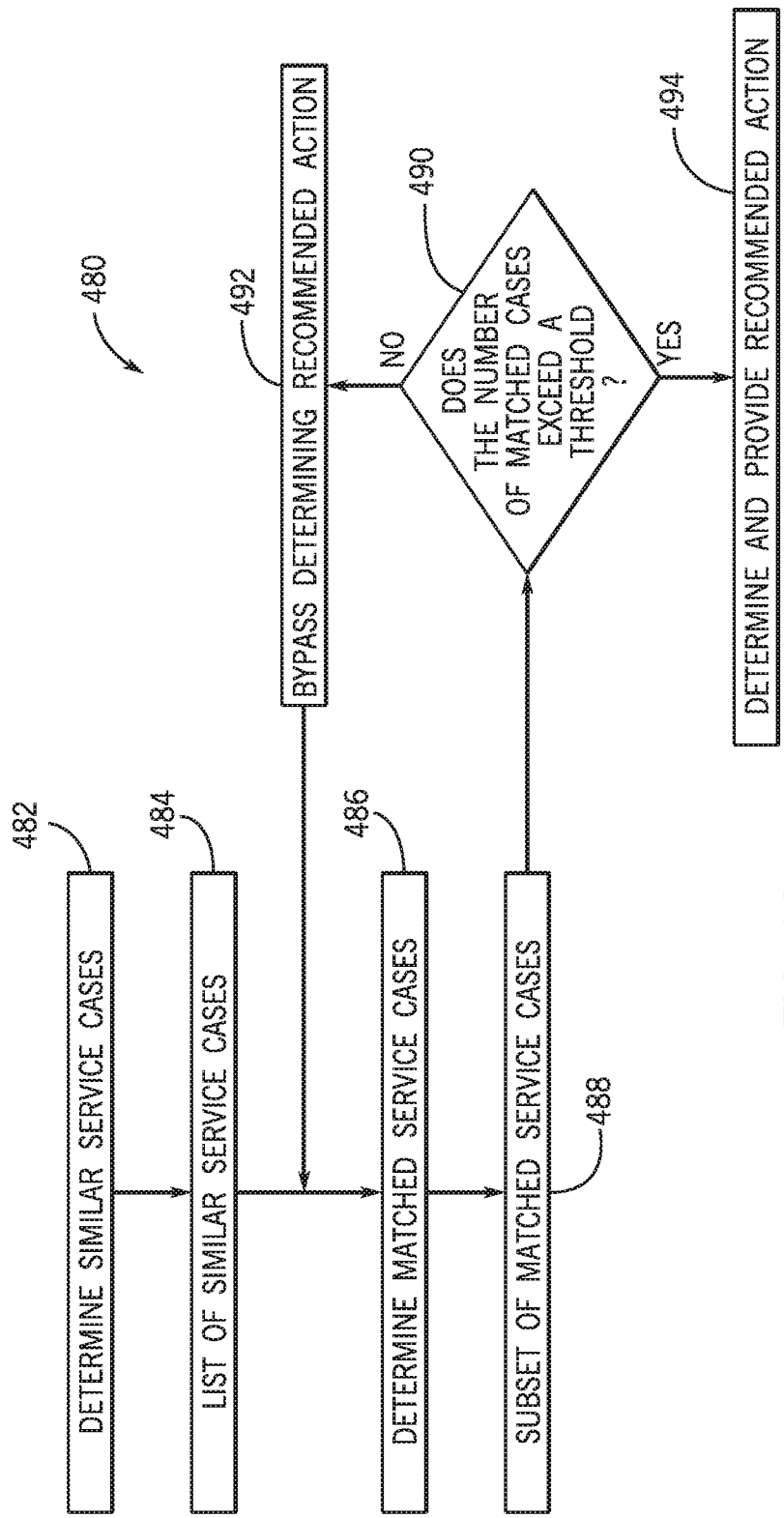
FIG. 12 is a flowchart of an embodiment of a method for a case management application to identify and provide recommended actions, in accordance with aspects of the present disclosure.

FIG. 12 is a flowchart of a method or process 480 that may be used by the case management application to identify and provide a recommended action to the user. For example, the method 480 may be initiated upon opening or creating a service. It should be noted that the method 480 is a non-limiting technique. That is, other steps may be performed in addition to the steps depicted in FIG. 12, or certain steps of the method 480 may be modified, excluded, or performed in a different order.

At block 482, the case management application determines similar service cases associated with the service case created by the user. For example, the case management application may match keywords or phrases entered by the user (e.g., into a short description of the service case) with keywords or phrases of multiple other service cases. Additionally or alternatively, the case management application may match a certain characteristic (e.g., geographic location, degree of experience, job title) of the user with similar service cases that were modified or created by users with a similar characteristic. As a result of the steps performed at block 482, the case management application may produce a list of similar service cases, as shown at block 484.

At block 486, the case management application may determine matched service cases from the list of similar service cases. The case management application may reference one or more recommendation tools 252 to identify the matched service cases. For example, the case management application uses one or more trend models 346 included in the one or more recommendation tools 252 to search the similar service cases for service cases having a shared common feature. The service cases having the shared common feature are identified as match cases such that the case management application has determined a subset of matched service cases, as shown at block 488.

At block 490, the case management application determines if the number of matched service cases has exceeded a threshold number, such as a threshold number indicated by the threshold field 376. As mentioned herein, the threshold number may be a number of matched cases or a percentage of matched cases relative to a total number of similar cases.

If the threshold number is not exceeded, the case management application may not identify a recommended action associated with the matched cases, as shown at block 492. The case management application may then use another recommendation tool 252 and/or another trend model 346 included in a particular recommendation tool 252 to identify a recommended action. For example, the case management application may sequentially proceed to the recommendation tool 252 and/or the trend model 346 of the next order and repeat the steps of block 486, 488, and 490 to identify other matched service cases and determine if the number of other matched service cases has exceeded the threshold number.

At block 494, if the number of matched cases exceeds the threshold number, the case management application determines a recommended action based on the matched service cases. For example, if a common action is associated with each case of the matched cases, the case management application may recommend the common action to the user. In another example, if a particular action is noted as being successful, even if the particular action is associated with only a portion of the matched cases, the case management application may recommend the particular action to the user. In further embodiments, the recommended action may be stored on a table (e.g., a table associated with the table field 256 and/or the reference table field 404), and the case management application may refer to the table based on the shared common feature and the threshold number.

In further embodiments, if the case management application determines a recommended action via the steps of block 494, but the recommended action is noted as being ineffective or unsuccessful, the case management application may bypass providing the recommended action to the user. That is, the case management application may perform steps similar to the steps described with reference to block 492 and not send the recommended action. As such, the case management application may avoid providing a faulty recommended action to the user.

Figure 13:
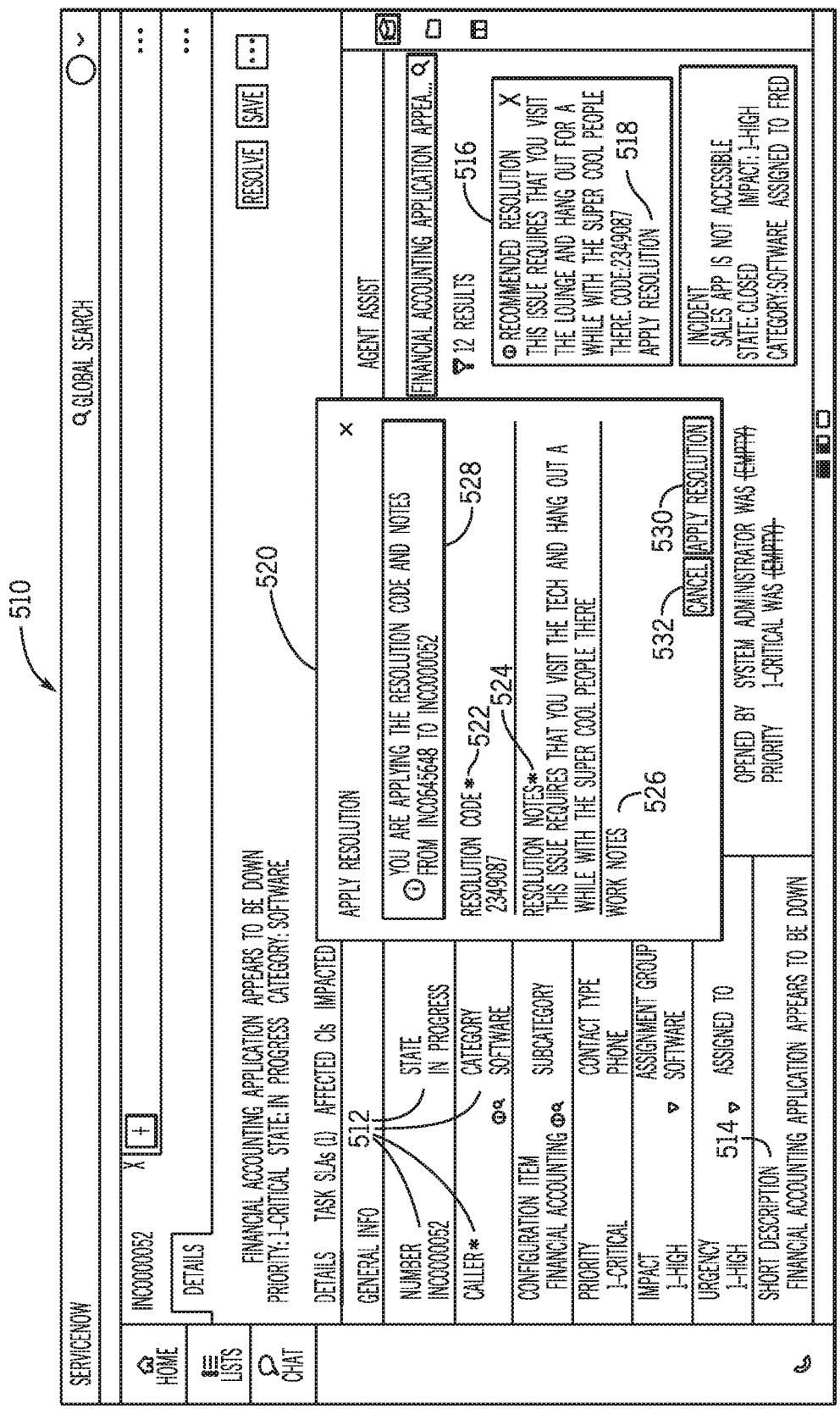
FIG. 13 is an embodiment of a user interface that may be accessed by a user of a case management application to open a service case, in accordance with aspects of the present disclosure.

FIG. 13 is an embodiment of a user interface 510 that may be accessed by the user of the case management application to open a service case. The user interface 510 may include a plurality of fields 512 where the user may enter information associated with the service case. Based on the information entered by the user, the case management application may provide a recommended action, such as via the method 480. In some embodiments, the user interface 510 may include a short description field 514, in which the user may input typed information. The case management application may then use keywords and/or phrases of the typed information to determine similar service cases and matched cases of the similar service cases. In additional or alternative embodiments, the user interface 510 may use information entered into any of the fields 512 of the user interface 510. In further embodiments, the user interface 510 may use information associated with the user (e.g., geographic location, degree of experience, job title). By way of example, the user may log into a server to access the user interface 510, in which the user's login information is used to search for similar events.

Once the case management application has determined a recommended action, the case management application may display the recommended action on the user interface 510, such as at a recommendation field 516. For example, the case management application may display one of the recommendation cards of FIG. 11 in the recommendation field 516. The user may act upon the provided recommended action via the recommendation field 516. In some embodiments, the user may be able to select a first "apply" icon 518. Upon selection of the first "apply" icon 518, a recommendation interface 520 may superimpose on the user interface 510. Additionally or alternatively, the user may be navigated to the recommendation interface 520. The recommendation interface 520 may display an identification field 522 that may include a unique identifier associated with the particular recommended action, a recommendation notes field 524 that may include a particular message associated with the recommended action, and a work notes field 526 that may include a comment or footnote associated with the recommended action. Moreover, the recommendation interface 520 may include a notification 528 that may display additional information associated with the recommended action. In the illustrated embodiment, the notification 528 displays information that notifies the user the particular service case from which the particular recommended action was identified, but in additional or alternative embodiments, the notification 528 may display other information, such as a success rate, a number of times the recommended action has been previously applied, and/or other suitable information that the user may account for when deciding to apply the recommended action.

If the user decides to apply the recommended action, the user may select a second "apply" icon 530 that is displayed on the recommendation interface 520. Upon selection of the second "apply" icon 530, the case management application may send information associated with the recommended action, such as the identification field 522 and/or the recommendation notes field 524, to a customer or client of the service case that the user is assisting. If the user decides not to apply the recommended action, the user may select a "cancel" icon 532 that may close the recommendation interface 520. The user may further close the recommendation card displayed at the recommendation field 516 such that the provided recommended action is no longer displayed on the user interface 510. In this manner, the user may determine whether or not to apply the recommended action, such as after reviewing information regarding the recommended action via the recommendation interface 520.

The present disclosure is related to a case management application that may be utilized by a user to open a service case associated with a service event. The case management application may receive information associated with the service case and/or the user to provide a recommended action to address the service event. In some embodiments, the case management application may access a recommendation tool to provide the recommended action. For example, the case management application may search for similar service cases based on the received information. The case management application may then search the similar service cases for matched cases that share a common feature as determined by a trend model of the recommendation tool. Based on the respective actions performed in each matched case, the case management application may determine a suitable recommended action to provide to the user. By automatically providing the user with a recommended action, the case management application may reduce an amount of time the user may take to address the service event. For example, the user may apply the recommended action to address the service event without having to determine appropriate actions manually.

A designer may be able to modify the recommendation tool accessed by the case management application. For example, the designer may modify the trend model used by the case management application to search similar service cases for matched cases. In this manner, the designer may adjust how the case management application searches for matched cases and also how the case management application determines a recommended action to provide to the user.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A non-transitory computer-readable medium comprising instructions, wherein the instructions, when executed by at least one processor, are configured to cause the at least one processor to:
   cause display of an interface configured to open a service case;
   receive, via the interface, login information from a user associated with a service case;
   identify a characteristic of the user based on the login information;
   identify a plurality of other users based on a match between the characteristic of the user and respective characteristics of the plurality of other users;
   identify a plurality of additional service cases submitted by the user and the plurality of other users;
   access a plurality of recommendation tools based on the login information of the user, wherein each recommendation tool of the plurality of recommendation tools comprises a plurality of search models, and the plurality of search models are configured to search for a respective common feature within service cases upon application of a corresponding recommendation tool of the plurality of recommendation tools;
   determine an order of the plurality of recommendation tools for application on the plurality of additional service cases;
   apply a first recommendation tool of the plurality of recommendation tools on the plurality of additional service cases based on the order;
   use a first search model of the first recommendation tool to search the plurality of additional service cases based on a first common feature associated with the first search model to identify one or more first matched service cases that share the first common feature;
   determine that a first quantity of the one or more first matched service cases is below a threshold quantity;
   apply a second recommendation tool of the plurality of recommendation tools on the plurality of additional service cases based on the order in response to a determination that the first quantity is below the threshold quantity;
   use a second search model of the second recommendation tool to search the plurality of additional service cases based on a second common feature associated with the second search model to identify one or more second matched service cases that share the second common feature;
   determine that a second quantity of the one or more second matched service cases is above the threshold quantity;
   identify a database table referred to by the second search model in response to a determination that the second quantity is above the threshold quantity;
   retrieve a recommended action defined by the database table; and
   modify the interface to display the recommended action.

2. The non-transitory computer-readable medium of claim 1, wherein the instructions, when executed by the at least one processor, are configured to cause the at least one processor to access the plurality of recommendation tools from a plurality of available recommendation tools based on the login information.

3. The non-transitory computer-readable medium of claim 1, wherein the instructions, when executed by the at least one processor, are configured to cause the at least one processor to display the recommended action via recommendation card and display an additional interface upon receiving selection of the recommendation card.

4. The non-transitory computer-readable medium of claim 3, wherein the instructions, when executed by the at least one processor, are configured to cause the at least one processor to display a plurality of information associated with the recommended action via the additional interface, and wherein the plurality of information comprises an identification, recommendation notes, work notes, a notification, or any combination thereof.

5. The non-transitory computer-readable medium of claim 3, wherein the instructions, when executed by the at least one processor, are configured to cause the at least one processor to display a selectable apply icon via the additional interface and to send information associated with the recommended action to a customer upon receiving a selection of the selectable apply icon.

6. The non-transitory computer-readable medium of claim 1, wherein the instructions, when executed by the at least one processor, are configured to cause the at least one processor to receive the login information via a user input entered onto the interface.

7. The non-transitory computer-readable medium of claim 1, wherein the plurality of recommendation tools are stored on a database.

8. A system, comprising:
   one or more databases; and
   one or more servers having one or more processors, the one or more servers in communication with the one or more databases and configured to support one or more client instances hosted by a platform, wherein the one or more client instances support application and data access on one or more remote client networks, wherein the one or more servers are configured to perform operations comprising:
     receiving login information of a user;
     receiving information associated with a service case;
     identifying a characteristic associated with the user based on the login information in response to receiving the information associated with the service case;
     identifying a plurality of other users based on a match between the characteristic associated with the user and respective characteristics associated with the plurality of other users;

identifying a plurality of additional service cases submitted by the user and the plurality of other users;

accessing two or more recommendation tools stored on the one or more databases based on the login information, wherein each recommendation tool of the two or more recommendation tools comprises two or more search models, the two or more search models are configured to search for a respective common feature within service cases upon application of a corresponding recommendation tool of the two or more recommendation tools, and each search model of the two or more search models refers to a respective database table defining a recommended action;

apply a recommendation tool of the two or more recommendation tools on the plurality of additional service cases;

determine an order of a plurality of search models of the recommendation tool;

using a first search model of the recommendation tool based on the order to search the plurality of additional service cases based on a first common feature associated with the first search model to identify one or more first matched service cases of the plurality of additional service cases, wherein the one or more first matched service cases share the first common feature;

determining that a first quantity of the one or more first matched service cases is below a threshold quantity;

in response to a determination that the first quantity is below the threshold quantity, using a second search model of the recommendation tool based on the order to search the plurality of additional service cases based on a second common feature associated with the second search model to identify one or more second matched service cases of the plurality of additional service cases, wherein the one or more second matched service cases share the second common feature;

determining that a second quantity of the one or more second matched service cases s above the threshold quantity;

accessing the respective database table referred to by the second search model to retrieve the recommended action defined by the respective database table in response to a determination that the second quantity is above the threshold quantity; and applying the recommended action upon retrieving the recommended action.

9. The system of claim 8, wherein the characteristic comprises a geographic location, a degree of experience, a job title, or any combination thereof.

10. The system of claim 8, wherein the threshold quantity comprises a total number, a percentage of a quantity of the plurality of additional service cases, or both.

11. The system of claim 8, wherein the first common feature, the second common feature, or both, comprise a similar major incident, a potential major incident, a similar attached knowledge article, a similar related problem, a similar related caused change, a similar resolution code, or any combination thereof.

12. The system of claim 8, wherein the one or more servers are configured to perform operations comprising:
receiving the login information via an interface, and
modifying the interface to provide information associated with the recommended action in response to applying the recommended action.

13. The system of claim 8, wherein the one or more servers are configured to bypass accessing the respective database table referred to by the first search model in response to determining that the first quantity is below the threshold quantity.

* * * * *